(12) United States Patent
Niebert

(10) Patent No.: US 10,165,655 B2
(45) Date of Patent: Dec. 25, 2018

(54) CONTROL OF PIXEL ADDRESSABLE LED STRIPS

(71) Applicants: UNIVERSITE D'AIX-MARSEILLE, Marseilles (FR); CENTRE NATIONAL DE LA RECHERCHE SCIENTIFIQUE, Paris (FR)

(72) Inventor: Peter Franz Niebert, Marseilles (FR)

(73) Assignees: UNIVERSITE D'AIX-MARSEILLE, Marseilles (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 0 days.

(21) Appl. No.: 15/558,516

(22) PCT Filed: Mar. 17, 2016

(86) PCT No.: PCT/EP2016/055879
§ 371 (c)(1),
(2) Date: Sep. 14, 2017

(87) PCT Pub. No.: WO2016/150828
PCT Pub. Date: Sep. 29, 2016

(65) Prior Publication Data
US 2018/0084625 A1 Mar. 22, 2018

(30) Foreign Application Priority Data
Mar. 20, 2015 (EP) .................................. 15160111

(51) Int. Cl.
*H05B 33/08* (2006.01)
*H05B 37/02* (2006.01)

(52) U.S. Cl.
CPC ..... *H05B 37/0254* (2013.01); *H05B 33/0803* (2013.01); *H05B 33/0842* (2013.01); *Y02B 20/348* (2013.01)

(58) Field of Classification Search
CPC .............. H05B 37/02; H05B 37/0227; H05B 37/0272; H05B 33/08; H05B 33/0842; H05B 33/0845
(Continued)

(56) References Cited

U.S. PATENT DOCUMENTS 8,299,719 B1 * 10/2012 Moshirnoroozi .. H05B 33/0806
315/185 R
8,492,983 B1 7/2013 Berg et al.
(Continued)

FOREIGN PATENT DOCUMENTS

DE 20 2007 002315 U1 3/2008

*Primary Examiner* — Jimmy Vu
(74) *Attorney, Agent, or Firm* — Baker & Hostetler LLP

(57) ABSTRACT

A system of control of interconnected signal emitters comprises controller modules, microcontrollers, electronic drivers and signal emitters. The connection input of each electronic driver is connected to the output of another electronic driver or to the output of a microcontroller, and the single output of each electronic driver is connected to the single connection input of another electronic driver or to the output of a microcontroller; each electronic driver being part of a driver chain between controller modules. Described developments comprise the use of Light-Emitting Diodes (LEDs), LED strips, sensors (e.g. ambient light, distance, motion, proximity, imaging, audio, temperature, pressure, etc), wired and/or wireless communication interfaces, power supply configurations and different topological arrangements (e.g. 2D, 3D, unidirectional or bidirectional arrangements, root or bridge vertices, interactive mesh, k-cyclic graphs, etc). Associated method steps (e.g. protocols, clock synchronization, broadcast, vote, update, latency, bitstream structure, etc) are described.

15 Claims, 5 Drawing Sheets

(58) Field of Classification Search
USPC .... 315/129–134, 185 R, 150–152, 291, 297, 315/307, 308, 312
See application file for complete search history.

(56) References Cited

U.S. PATENT DOCUMENTS

2004/0160199 A1\* 8/2004 Morgan .................. A01M 1/04
  315/312
2009/0289578 A1   11/2009 Peng \* cited by examiner

CONTROL OF PIXEL ADDRESSABLE LED STRIPS

CROSS-REFERENCE TO RELATED APPLICATIONS

This application is a National Stage of International patent application PCT/EP2016/055879, filed on Mar. 17, 2016, which claims priority to foreign European patent application No. EP 15160111.9, filed on Mar. 20, 2015, the disclosures of which are incorporated by reference in their entirety.

TECHNICAL FIELD

This patent relates to the field of electrical engineering and more particularly to methods and systems for the distributed and interactive control of pixel-addressable LED strips.

BACKGROUND ART

Modern LEDs have many advantages over incandescent or other kind of light sources, including lower energy consumption, longer lifetime, improved physical robustness, smaller size, and faster switching. Costs are decreasing rapidly due to mass production and improving technology.

Modern LEDs are sometimes provided on LED strips. An initial technical problem lies in the interconnection of such LED strips, generally requiring dedicated hardware. For industrial or domestic or even artistic lighting, there is a need for methods and systems of interconnecting such LED strips, and, once interconnected, to appropriately control such LED strips.

The patent literature comprises few relevant documents regarding the control of LED strips. Documents related to micro-LEDs (for example those describing flat panels) have been discarded; involved technologies are different and the interconnection problem does not even exist. In the relevant technical domain of lighting, the patent document U.S. Pat. No. 8,492,983 entitled "System and method to address and control serially connected LEDs" discloses systems and methods for networking and control of lighting systems. In particular, this application relates to the addressing and control of light emitting diodes (LEDs) connected serially on a bus within a network of serially bussed LEDs. The approaches described in the document alleges to "simplify and lower the cost of control by distributing the control functions between a serial bus controller and controllers associated with individual LEDs or LED circuits on the serial bus. Hardware intensive decoding of predefined addresses, or time consuming address processing and determining algorithms, are not employed. Instead, the addressing method disclosed both simplifies the system by reducing hardware requirements and improves the speed of the data packets and reduces packet latency moving down the serial bus". This approach presents limitations.

There is a need for systems and methods of handling interconnected LEDs' strips.

SUMMARY OF THE INVENTION

There is disclosed a system of control of interconnected signal emitters, the system comprising controller modules, microcontrollers, electronic drivers and signal emitters. The connection input of each electronic driver is connected to the output of another electronic driver or to the output of a microcontroller, and the single output of each electronic driver is connected to the single connection input of another electronic driver or to the output of a microcontroller; each electronic driver being part of a driver chain between controller modules. Described developments comprise the use of Light-Emitting Diodes (LEDs), LED strips, sensors (e.g. ambient light, distance, motion, proximity, imaging, audio, temperature, pressure, etc), wired and/or wireless communication interfaces, power supply configurations and different topological arrangements (e.g. 2D, 3D, unidirectional or bidirectional arrangements, root or bridge vertices, interactive mesh, k-cyclic graphs, etc). Associated method steps (e.g. protocols, clock synchronization, broadcast, vote, update, latency, bitstream structure, etc) are described.

There is disclosed a system of control of interconnected signal emitters, the system comprising: (a) a plurality of controller modules, a controller module comprising a microcontroller having a connection input and a connection output; a microcontroller controlling one or more electronic drivers; (b) a plurality of electronic drivers, an electronic driver controlling one or more signal emitters and comprising a connection input and a connection output; the system being characterized in that (i) the connection input of each electronic driver is connected to the output of another electronic driver or to the output of a microcontroller, and (ii) the single output of each electronic driver is connected to the single connection input of another electronic driver or to the output of a microcontroller; and in that (iii) each said electronic driver is a part of a driver chain between two controller modules.

Micro-controllers can control electronic drivers. Electronic drivers can control signal emitters. Micro-controllers thus can control signal emitters. An electronic driver is being connectable to at least one signal emitter. An electronic driver can be connected to a signal emitter in order to control it.

In a development, controller modules, electronic drivers and their connections are part of a strongly connected graph.

In a development, at least one electronic driver is connected to a microcontroller which is not part of a controller module.

In a development, signal emitters comprise Light-Emitting Diodes (LEDs).

In a development, LEDs and electronic drivers are disposed on LED strips.

In a development, the system further comprises one or more LED vertex arrangement of LED strips, said LED vertex arrangement comprising three unidirectional LED strips arranged in a triangular pattern.

In such an embodiment, three LED strips are arranged along the edges of a triangulated pattern and three controller modules constitute the vertices of the triangulated pattern, the three LED strips being oriented in such a way that each LED strip is in a cycle of at most four LED strips.

In an embodiment, the system comprises a bidirectional arrangement of unidirectional LED strips. A bidirectional arrangement comprises two LED strips with their respective daisy chains intertwined in opposite directions. Unidirectional LED strips are arranged in an «inverted way» (i.e. «head to toe»), thereby providing a bidirectional communication. The system comprises at least one pair of unidirectional LED strips arranged in opposite directions, said pair providing bidirectional communication.

In a development, one or more controller modules comprise wired and/or wireless communication interfaces to receive or to send data.

In a development, one or more controller modules comprise one or more sensors, a sensor being selected from the group comprising an ambient light sensor, a distance sensor, a motion sensor, a proximity sensor, an imaging sensor, a microphone, a temperature sensor, a pressure sensor, a moisture sensor, a voltage power sensor or a combination thereof.

According to an aspect of the invention, controller modules are directly interconnected by said LED strips without additional and/or dedicated communication wires.

According to an aspect of the invention, at least one LED strip is hot-pluggable to and from the described meshed system comprising interconnected LED strips and microcontrollers.

In a development, the system further comprises one or more power supply sources, said power supply sources being adapted to distribute power to controllers modules and LED strips.

In a development, a controller module and/or a signal emitter and/or an electronic driver are adapted to distribute said power supply to the entire system.

There are disclosed systems and methods for the distributed and/or interactive control of pixel addressable LED strips.

Advantageously, the systems and methods according to the invention enable a decentralized control of LEDs and are scalable. In particular, it can be sufficient to introduce enough microcontrollers into a mesh of LED strips so that the collective computing power suffices for the application. At a constant «density» of microcontrollers, there is virtually no limit to the size of an installation. The fact that sensors are close to the controlled LEDs advantageously simplifies the match of cause and effect of sensed events (such as human gestures), for example compared to the need of calibrating a camera to an actual LED installation.

Advantageously, arbitrary topologies can be programmed in a uniform manner (e.g. wave propagation through LED strips).

Advantageously, commissioning may be not required (at least in some embodiments).

Advantageously, according to some embodiments of the invention, one or more microcontrollers can be powered through the LED strips, allowing cable-free installations or at least installations with reduced or minimized hardware requirements (required cables are those for injecting current into the meshed network, typically at edges of the mesh). In other words, in some embodiments of the invention, there is not required dedicated command circuits, since the protocol—relying on LED strips—enables to establish communication links between microcontrollers (µC).

Further advantages of the present invention will become clear to the skilled person upon examination of the drawings and detailed description. It is intended that any additional advantages be incorporated therein.

DESCRIPTION OF THE DRAWINGS

Embodiments of the present invention will now be described by way of example with reference to the accompanying drawings in which like references denote similar elements, and in which.

DETAILED DESCRIPTION OF THE INVENTION

Figure 1:
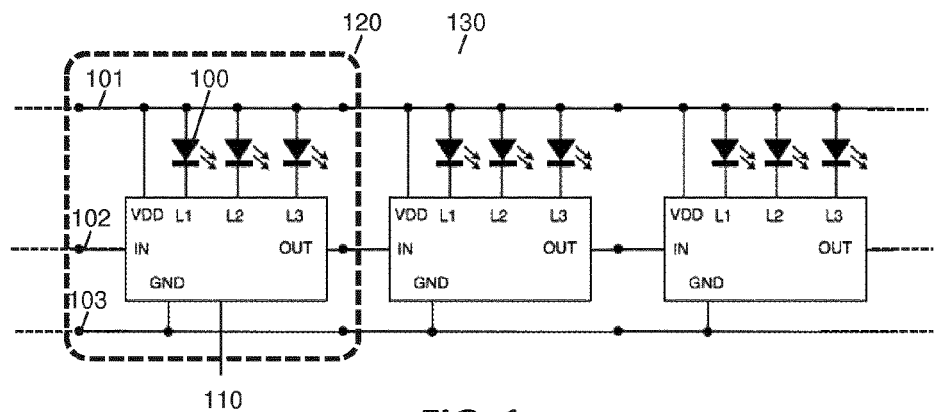
FIG. 1 illustrates the structure of a LED strip.

Definitions of terms are now provided.

A "signal emitter" can be a LED or another device. While the description provides examples for lighting systems such as LEDs, the technical teaching of the present disclosure is equally applicable to other signal emitters than LEDs (e.g. Internet of things, etc).

A light-emitting diode (LED) is a two-lead semiconductor light source. It is a pn-junction diode, which emits light when activated. When a fitting voltage is applied to the leads, electrons are able to recombine with electron holes within the device, releasing energy in the form of photons (electroluminescence). The color of the emitted light is determined by the energy band gap of the semiconductor. Modern LEDs are available across the visible, ultraviolet, and infrared wavelengths, with very high brightness.

A LED according to the methods and systems of the invention is a macroscopic LED (typically of about or less than 1 mm2). Micro-LEDs (i.e. composing displays or otherwise electronic screens) are generally not used in or by the present invention. In presence of micro-LEDs which can be arranged adjacent to each other's and of miniaturized components (e.g. controller modules), extensible and/or reconfigurable displays (e.g. panels or screens) can be enabled by the invention. Unless specified differently in the following description, a LED is a macroscopic LED.

LEDs have many advantages over incandescent or other kind of light sources, these advantages including lower energy consumption, longer lifetime, improved physical robustness, smaller size, and faster switching. Associated costs are decreasing rapidly due to mass production and improving technology.

A "LED strip" comprises a plurality of LEDs. A pixel-addressable LED strip comprises a plurality of LEDs (color or monochrome) as well as one or more daisy-chained microcontrollers or "controller chips" (for one or several LEDs). These chips can control the brightness of LEDs, e.g. by pulse width modulation. A certain number of bits determine the control of a LED output of the chip. A LED strip can comprise I/O connections. Each LED strip (or "LED chain") is controlled by a microcontroller which generates the reset signals and then the signal including updated control information for each further LED 100 in the LED chain or strip 210. Power links provide the source of energy to LEDs (i.e. LED strips)

A "controller module" comprises a microcontroller, a connection input and a connection output.

A "micro-controller" (sometimes abbreviated µC, uC or MCU) is a small "computer" on a single integrated circuit containing a processor core, memory, and programmable input/output peripherals. Program memory in the form of NOR flash or OTP ROM is also often included on chip, as well as a typically small amount of RAM. Microcontrollers are designed for embedded applications, in contrast to the microprocessors used in personal computers or other general purpose applications.

An "IC driver" or "electronic driver" commands one or more LEDs. A LED strip is a linear assembly of LED (electronic) drivers. Said electronic drivers can be daisy-chained. In electrical and electronic engineering, a daisy chain is a wiring scheme in which multiple devices are wired together in sequence or in a ring. Daisy chains can be used for power, analog signals, digital data, or a combination thereof. The term daisy chain refers to large scale devices connected in series. In a specific embodiment, the system according to the invention can comprise one (single) electronic driver. In general, embodiments of the invention comprise a plurality of electronic drivers. The communication interfaces (I/O) for communicating with a LED electronic driver can either be physically implemented in the microcontroller or realized on secondary integrated circuits connected by other interfaces to the microcontroller or even be realized by programmable logic in microcontrollers (FPGA and the like). Dedicated multi connection interfaces can free or release the microcontroller from time-consuming tasks and improve the synchronization across the mesh.

The invention presents both hardware and software aspects. On top of structural characteristics corresponding to system features, a plurality of control algorithms i.e. method steps can be implemented.

System features are first described.

FIG. 1 illustrates the structure of a LED strip 130. The LED strip 130 comprises a plurality of "controller modules" 120. A controller module 120 according to the invention comprises a plurality of LEDs 100, at least one microcontroller 110, and generally comprises three wires: a ground line 103, a power line 101 (typically 5 VDC) and a communication line 102 incoming from one side and outgoing to the other side. This disposition or arrangement of connectable controller modules allows for a repeatable pattern suited for LED strips' products. In other words, with communication interfaces via communication lines 102, a plurality of modules can be arranged into networks or meshes or webs or geometric arrangements or patterns or grids (e.g. in two dimensions or 2D, but also in three dimensions i.e. 3D arrangements).

In an embodiment, (at least some) controller modules are "hot-pluggable" or "hot-swappable", i.e. can be added or removed on demand. Such a configuration is advantageous with respect to the management of lighting in buildings (e.g. if new rooms are opened for service in a building, simple additions to the lighting mesh can be performed). In particular, the mesh of controller modules is auto-configurable (e.g. the topology of the network does not need to be known in advance)

Figure 2:
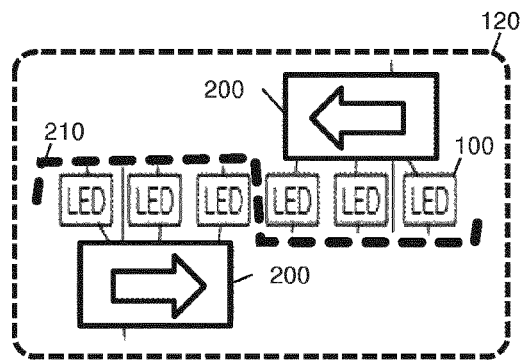
FIG. 2 shows an exemplary representation of a "controller module"

The FIG. 2 shows an exemplary representation of a "controller module" 120. A controller module comprises a microcontroller (not shown), a connection input and a connection output. The controller module 120 comprises an "IC driver" or "electronic driver" 200, which is unidirectional. An electronic driver 200 is connectable to at least one signal emitter. An electronic driver 200 comprises a single connection input and a single connection output. Controller modules 120, signal emitters and electronic drivers 200 are powered by one or more energy sources or power-supply.

Figure 3:
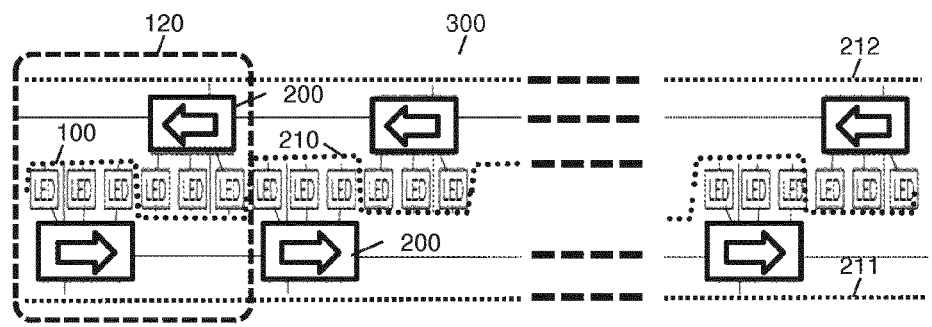
FIG. 3 shows a representation of a "bi-directional" LED strip.

The FIG. 3 shows a representation of a "bi-directional" LED strip 300, comprising an arrangement of a plurality of controller modules 120, each said controller module comprising a plurality of unidirectional electronic drivers 200. LEDs are interlaced (210) and power lines are represented (211,212).

Figure 4A:
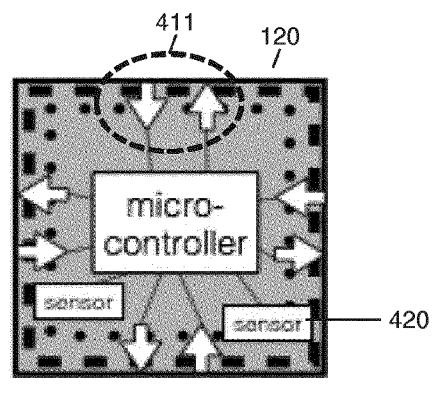
FIGS. 4A and 4B show examples of controller modules.
Figure 4B:
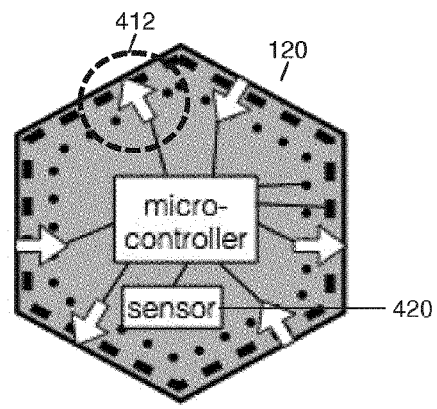

The FIGS. 4A and 4B show examples of controller modules 120.

Controller modules can have different geometries. The example shown on FIG. 4A is a squared controller module with bi-directional data connections 411. The example of the FIG. 4B is an hexagonal controller module, with unidirectional data connections 412.

A controller module distributes both data and energy.

A controller module enables the distribution of data (e.g. receiving/emitting data; transmitting data). It serves as a gateway (e.g. converting or formatting data) for other communication protocols (for example TCP over IP, DMI, DaLi and others). The gateway enables the software distribution (e.g. updates) for other controller modules. By an association with one or more sensor sources, a controller module also can "create" data.

A controller module also participates in the power supply of the mesh. A controller module comprises power distribution lines such as GND/VSS (dashed lines) or VDD/+5V (points). As shown on the figures, controller modules enable LED strips to be electrically connected (in particular microcontrollers are appropriately powered on). A controller module does not require a dedicated power source nor a dedicated power line, but can be powered by a LED strip (and vice versa). It is sufficient to power the mesh (for example at a limited entry points, e.g. controller modules and/or LED strips); by construction, the mesh will distribute the power supply to all edges and vertices (i.e. controller modules and LED strips, in fine to LEDs for lighting). Hardware requirements (e.g. cables) are minimized.

A controller module can interconnect one or more power lines of the connected LED strips, thus participating in power distribution. One type of vertices receives power its from the LED strips, another type of vertices has connectors for power supplies for injecting power into the mesh. Alternatively, power can be injected directly by connectors to LED strips. The power supply of the mesh can be partitioned (e.g. by disconnecting the positive lines between zones or portions of the global mesh) into separately powered zones (or portions of the global mesh), while preserving the communication links between the zones (or portions of the global mesh). This way, arbitrarily large meshes can be powered from several energy sources.

A controller module is a hardware device disposing of at least one microcontroller, two or more connectors to connect with LED strips and one or more communication interfaces 420 for connecting the micro-controller to the daisy-chain protocol. The connectors allow connecting to daisy chains either upstream or downstream. A micro-controller connected upstream to the daisy chain physically controls the LEDs in the chain and can send data via the daisy chain protocol to the micro controller on the vertex downstream of the daisy chain. The output of the last microcontroller in a LED strip/chain is routed to another microcontroller. This setup allows passing data through the LED chain from a source microcontroller to a target microcontroller as follows: the source microcontroller sends a combined bitstream through the chain of controller chips (e.g. microcontroller), one part of which is destined to the LED control, another part is destined to pass data from the source microcontroller to the target microcontroller.

Optionally (i.e. it is neither necessary nor required), a controller module 120 can carry one or more sensors 420. Such sensors are not carried by the LED strips but by controller modules. Such sensors can be "environmental" sensors. Frequently, examples of such sensors comprise ambient light sensors, distance, motion and proximity detecting sensors (PIR, ultrasound, etc), imaging sensors, microphones, temperature pressure and moisture sensors. For example, the provision of audio devices (microphones and speakers) on a controller module is inexpensive while allowing rich interactions with users. The provision of sensors associated with controller modules proves to be advantageous, in particular versus distributed interactive light control or management.

More generally, a sensor can be one of a (not exhaustive): microphone (e.g. the lighting will react to sounds), position sensor (e.g. artistic or convenience lighting according to occupancy), temperature sensor (e.g. body heat), pressure sensor, flow sensor (e.g. indicating air flows), oxygen sensor (e.g. indicating leaks and risks of fire or gas emanation of plants), parking sensor (e.g. indicating presence of a vehicle), speed sensor (e.g. indicating speed excess), carbon monoxide detector (e.g. indicating an imminent danger), oxygen sensor, ozone monitor, smoke detector (e.g. providing a first warning before a global alarm), magnetometer, MEMS, hygrometer (e.g. indicating risks of corrosion), flow sensor (e.g. indicating risks of flu transmission), gyroscope, accelerometer, occupancy sensor (e.g. adapting lighting to human traffic in a mall or commercial center), proximity sensor, biosensor (e.g. adapting providing visual indication to bio-risks), radar, sonar (e.g. special lighting in swimming pools), chemoreceptor (e.g. industrial applications), camera, 3D scanner or Time-of-flight camera (e.g. estimation of depth in interaction models).

A sensor also can be a voltage sensor, i.e. a sensor for measuring or monitoring power supply. Such sensors can serve to detect excessive, insufficient or otherwise abnormal power/energy consumptions, for example under-utilized parts of the mesh.

Not all controller modules need to carry all types of sensors. A controller module can comprise no sensor at all. A sensor can comprise one single sensor (releasable or attached to it). A controller module can comprise two or more sensors, etc. In some embodiments, controller modules are provided without any sensors (i.e. the entire system does not present any sensor). In some other embodiments, controller modules are provided with a plurality of redundant sensors of different types (the location of the sensors can be appropriately chosen at or during network installation or configuration). The modular approach enables to replace a module with a type of sensor by a module with another type of sensor. In some embodiments, sensors can be releasable, i.e. not rigidly or definitively attached to a controller module.

Topology aspects are now discussed.

Controller modules and LED strips can be connected in various configurations (and combinations thereof). Controller modules (vertices) and LED strips (edges) form a directed graph ("directed" because the edges of the graph are oriented edges). A directed graph is called k-cyclic if every edge is included in a cycle of length k. In a particular embodiment, the associated graph can be k-cyclic (with k superior or equal to 2). A graph is made up by «vertices» (plural of "vertex") or «nodes» and lines called «edges» that connect them. Vertices are also called nodes or points, and edges are also called arcs or lines. A mesh of controller modules (edges) and LED strips (vertices) can comprise a combination of different n-cyclic graph patterns or arrangements: a mesh for example can comprise 24 edges arranged in a 2-cyclic graph, 36 edges arranged in a 3-cyclic graph and 5 edges arranged in a 5-cyclic graph.

In an embodiment, the topology of the mesh is a strongly connected topology. A (directed) graph is said to be strongly connected if every vertex is reachable from every other vertex. The strongly connected components of an arbitrary directed graph form a partition into sub graphs that are themselves strongly connected. It is possible to test the strong connectivity of a graph, or to find its strongly connected components, in linear time. Advantageously, any node or vertex or edge can be reached: any LED on the LED strip can be addressed via the mesh infrastructure.

In an embodiment, the topology of the mesh is robust to cuts (i.e. vertex or edge removal). A cut, vertex cut, or separating set of a connected graph G is a set of vertices whose removal renders G disconnected. The edge cut of G is a group of edges whose total removal renders the graph disconnected.

Figure 5:
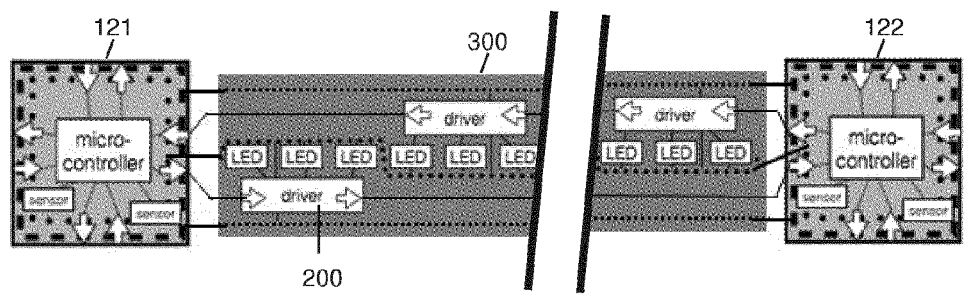
FIG. 5 shows an example of a 2-cyclic mesh arrangement.

The FIG. 5 shows an example of a 2-cyclic mesh arrangement, which is bidirectional. In such an arrangement, the back and forth connection (via a LED strip 300) between controller modules 121 and 122 is direct (i.e. connex topology). LED strips composed this way not only allow for bidirectional communication, but also allow non-linear chaining. One way to obtain a 2-cyclic graph is to connect two vertices by a pair of unidirectional LED strips.

In other words, there is shown a bidirectional LED strip 300, i.e. a "symmetric setup" or a specific arrangement of two LEDs with dedicated microcontrollers The pattern is repeatable and behaves like two intertwined LED strips: the controller generating the signal for «DIN» on the left of the figure directly controls every even position LED whereas the controller generating the signal for «DIN» on the right side controls the odd position LEDs. In other words, a LED strip can be bidirectional with two daisy chains in opposite directions.

Figure 6:
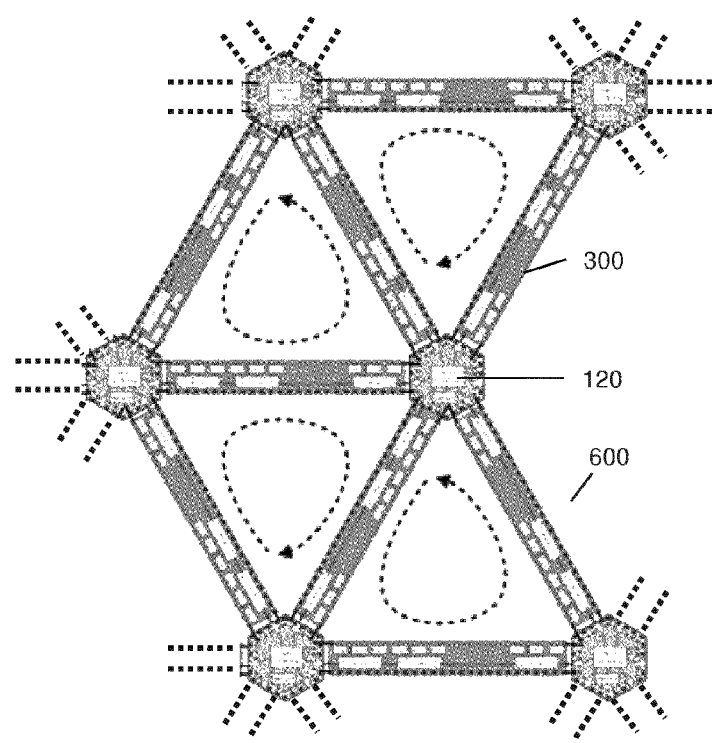
FIG. 6 shows an example of a 3-cyclic mesh arrangement.

The FIG. 6 shows an example of a 3-cyclic mesh arrangement. The exemplary portion of a mesh arrangement 600 comprises a plurality of (unidirectional) LED strips 300 and of controller modules 120. The example shows 3 edges connecting 3 nodes. 3-cyclic graphs can be obtained by assembling vertices and unidirectional LED strips in a triangular pattern by using a unique communication orientation for each of the three 120° directions of the mesh. For every LED strip in a 3-cyclic graph there is a one hop back route. The figure is a mere example of a possible arrangement of controller modules and LED strips. In particular, a real implementation can be considerably larger in size.

Figure 7:
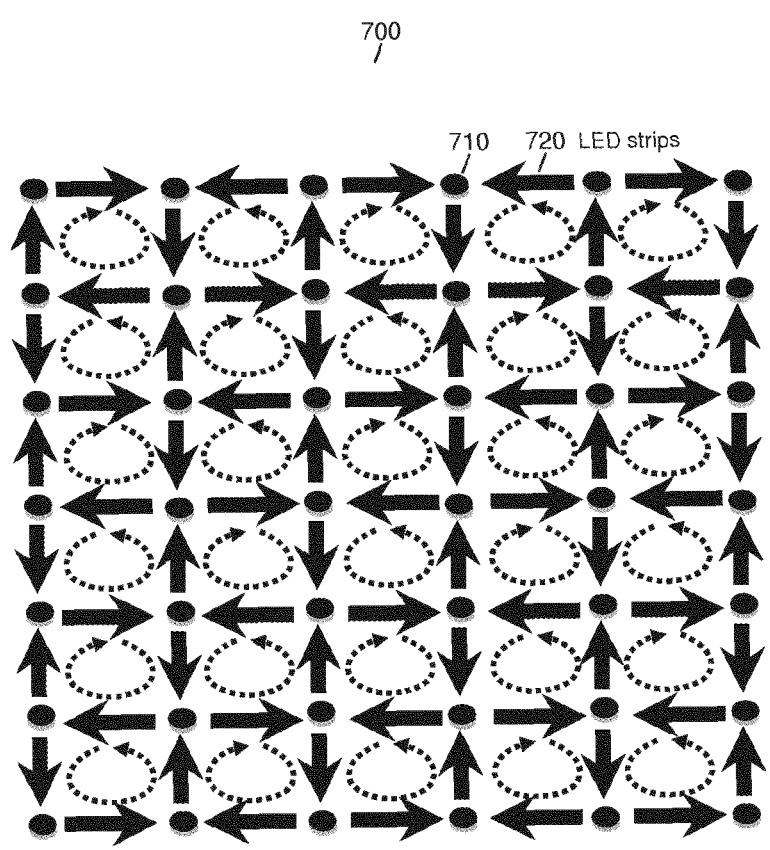
FIG. 7 illustrates a 4-cyclic mesh arrangement.

The FIG. 7 illustrates a 4-cyclic mesh arrangement 700, wherein each edge is bidirectional. Controller modules are illustrated by black circles 710 and LED strips are represented by arrows 720. 4-cyclic graphs can be obtained for rectangular grids in a Manhattan style pattern of alternating one way routes, etc. In a 4-cyclic graph, there is a two hop back route. The band width on a unidirectional connection is then shared between the data for the LEDs and the all routes passing through this edge.

Figure 8:
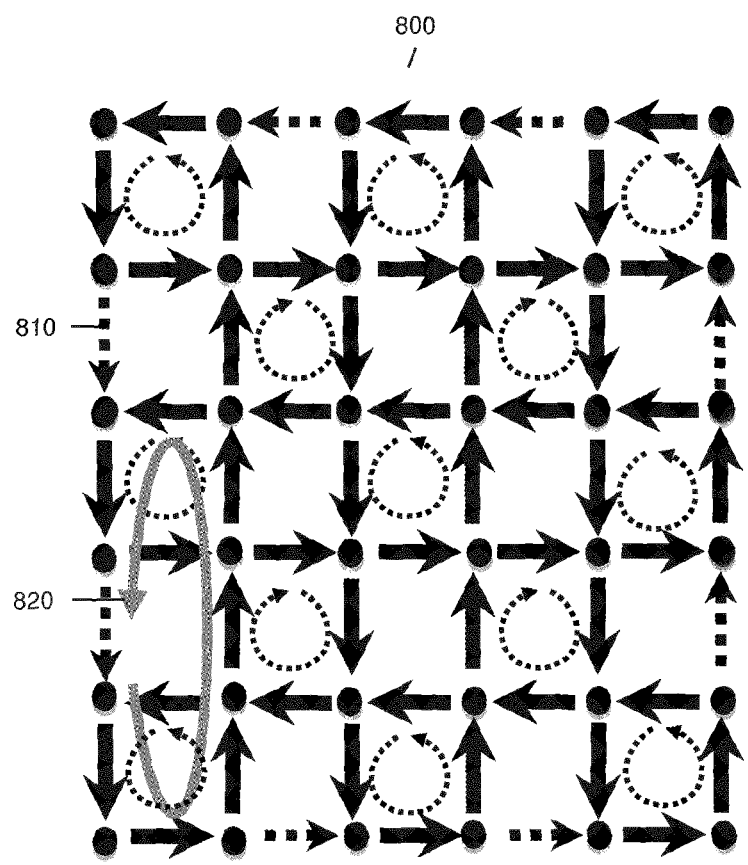
FIG. 8 shows another example of mesh arrangement.

The FIG. 8 shows another example of mesh arrangement 800. The topology comprises some unidirectional edges 810 (e.g. LED strips which are not arranged in a bidirectional construct as of the one of the FIG. 3). Such one-way edges are illustrated in grey. The graph is an 8-cyclic graph (820).

In some embodiments, the mesh of LED strips can be planar, e.g. on a flat or non-flat ceiling. In some embodiments, the mesh can be spatial i.e. in 3D. For example, a spatial installation or 3D construction can integrate a pair of opposed LED strips into a diffusing tube and vertices can be integrated into cases fitting the tubes, thus introducing molecular-like shapes.

Some further aspects of the topology of possible meshes are now discussed. Some vertices, for example "bridge" vertices, may include interfaces to wired or wireless communication networks in order to receive commands for the mesh or to send data collected from the mesh. In some embodiments, there can be one or more bridge vertices connected to a mesh. Among the bridge vertices, a particular "root" vertex can endorse the role of a "controlling master". In some embodiments, there are a limited number of such "controlling master" nodes.

On top of the tangible structure of the disclosed systems (i.e. system features), various logical layers (i.e. method steps) can be implemented. Aspects related to software control algorithms, i.e. method steps are now described.

Embodiments of the invention can use a diversity of driver protocols. In an embodiment, driver ICs are chainable shift registers with a global clock and latch signal and a chainable data signal, where the depth of the daisy chain is limited because of the use of global signals. In another embodiment, driver ICs communicate asynchronously at a defined speed over a single daisy chainable data line. In a third embodiment, driver ICs are linked using a double daisy chain with one line for data and the other line for the clock.

An example of a LED driver implementing the second type of protocol is Worldsemi WS2818 IC, which drives three LED channels (RGB) and consumes 24 bits for itself before passing through subsequent bits. Each high bit is coded as a high-high-low sequence and each low bit is coded as a high-low-low sequence at a defined speed. Such a LED driver does not know its position in the chain, nor whether it receives from a signal generating microcontroller or from another chip.

In an embodiment, there is disclosed a method of controlling a meshed network of LEDs, comprising the steps of periodically passing data from an upstream controller module of a LED strip through the LED strip to the downstream controller module, where the data is a combined bitstream, the first part of said bitstream controlling the driver ICs in the chain and the second part of the bitstream decoded and received by the downstream controller module. As an example, if within a period between two resets n bits can be sent to the daisy chain by the upstream controller module, but if the chain to the downstream controller module consumes only m bits, then the remaining n-m bits are passed through to the downstream controller module.

In an embodiment, controller modules generate and decode the driver protocol in software. In an embodiment, controller modules equipped with hardware or programmable logic implementations of sending and receiving interfaces for said driver protocols are used.

In an embodiment, the additional bits sent across the daisy chain are used to implement a unidirectional communication channel from the upstream controller module to the downstream controller module without additional hardware requirements (cables).

In some embodiments, the network infrastructure comprises controller modules linked by unidirectional communication channels in a connected directed graph, which are used to implement various distributed control algorithms.

In an embodiment, a distributed wave algorithm initiated by the root controller allows to determine for each node its distance (shortest path) from the root, as well as determine the maximum distance of any module from the root.

In an embodiment, a distributed algorithm initiated by the root controller module allows to attribute a unique identity to each controller module and to count the number of modules in the network.

In an embodiment, a distributed algorithm allows to inform each controller module the identities of the tree of its upstream controllers up to a certain depth. For k-cyclic graphs, a tree of depth k includes for each upstream controller module at least one branch with the identity of the controller module itself, and thus with a path leading back to the upstream controller module.

In an embodiment, backward paths are transformed to routing tables for implementing reverse channels and for establishing bidirectional communication between any pair of controller modules linked by a daisy chain.

In an embodiment, a distributed algorithm is used to determine the number of driver ICs in each daisy chain. This for example can be achieved by sending a defined sequence from the upstream controller module to the downstream controller module, which allows counting the number of consumed bits to determine the number of drivers in the downstream module, then by communicating this number through the backward channel back to the upstream module.

In an embodiment, a distributed algorithm is used to recover the topology of the network at the root and to pass it via the bridge to a connected controlling computer.

In an embodiment, there is no dedicated root module but each module is programmed with a unique ID in firmware and a root node is elected by a distributed algorithm. In such a case, the network can perform the disclosed method steps autonomously without the bridge function.

A second group of distributed algorithms based on the previous group implements generic communication services and is described thereafter.

In an embodiment, a distributed algorithm is used to broadcast information from the root across the network where information is propagated across the shortest path tree of the network. Broadcast can be used to send data either to all controller modules or a stream indexed by identities can be used to send data individually to each module.

In an embodiment, a distributed algorithm is used to collect (at the root) information from the modules by a reversed logic, mergecast.

In an embodiment, multiple bridge modules serve as multiple roots, each responsible for a part of the network, to increase the global bandwidth available for broadcast and/or mergecast.

In an embodiment, a plurality of distributed algorithms is used to periodically share data within the vicinity of controller modules.

Some of the previous embodiments can form the basis of/for distributed control algorithms, which are described hereinafter.

In an embodiment, broadcast is used to periodically route control commands from the root to the controller modules which interpret these commands to control downstream driver modules accordingly. In a development, the routed commands are translations from standard protocols such as DMX, KNX or DaLi. In an embodiment, the broadcast information is visual, such as still or moving images.

In an embodiment, the periodic sharing of data within a (spatial) vicinity is used to share sensor observations and to allow sensor fusion in/by each module. In an embodiment, sensor data fusion is used to improve sensing robustness as well as to track human gestures and movements (which may be undetectable by individual sensors).

In an embodiment, distributed algorithms are used to obtain coordinated (e.g. articulated, synchronized, organized, etc) effects and animations using a (e.g. comparatively) small amount of bandwidth for communication. For example, waves or cellular automata-like behaviors can be simulated locally in each controller module where the vicinity communication is used to coordinate the effect between neighboring controller modules. In an embodiment, the integration of raw and/or fusioned sensor observations into the distributed animation algorithm allows a low latency reaction to observed events (such as human gestures and movement).

In an embodiment, a local logic is combined with broadcast information in hybrid animations which comprise both the expressiveness of a global drawing and a low latency reaction to sensor data.

In an embodiment, raw or preprocessed sensor data is collected at the root vertex and passed to a controlling computer.

In some embodiments, distributed algorithms can be used for monitoring and deployment tasks, as in the following examples.

In an embodiment, changes in the topology are dynamically detected (e.g. hot plug, failure) and communicated back to a master controller module. In an embodiment, fusion of supply voltage sensor observations allows to determine electric current flow within the network and thus analyze the electric installation. In an embodiment, said voltage observations, optionally combined with dedicated animations, allow to identify failed LEDs.

In an embodiment, a broadcast algorithm can be used for a distributed firmware update operation, initiated from the root module.

Other embodiments for the optimization of the disclosed method are now described.

In an embodiment, clocks of the controller modules and the reset and communication phases of the controller modules are synchronized, whereby the root controller determines the time base and periodically sends synchronization waves through the network. Synchronized communication phases imply that neighboring controller modules start sending the outgoing sequences approximately at the same time and will have some overlap in the phase of sending and receiving controller to controller bits.

In an embodiment, the synchronization is achieved by propagating a reset signal from the root module across the network. In a development, the reset signal is delayed until propagation in modules by sending padding data. In an embodiment, this padding data is used for implementing asynchronous data channels, where the transmitted data volume can vary from one cycle to another. The propagation delay a for the reset condition on one daisy chain is accumulated and can reach $(k-1)\partial$ in k-cyclic graphs, which represents the worst case clock offset at the beginning of a communication cycle. The cycle period has to be designed to include padding time superior to this bound.

In an embodiment, the propagation in broadcast and mergecast is implemented in cycles, i.e. a receiving controller module passes on the received information to downstream modules in its next sending cycle. In another development, synchronized communication phases are used to pass on broadcast and mergecast data immediately after receiving it, thus reducing the routing latency in the broadcast protocol.

The invention claimed is:

1. A system of control of interconnected signal emitters, the system comprising:
   a plurality of controller modules, a controller module comprising a microcontroller having a connection input and a connection output;
   a microcontroller controlling one or more electronic drivers;
   a plurality of electronic drivers, an electronic driver controlling one or more signal emitters and comprising a connection input and a connection output;
   the system wherein
   the connection input of each electronic driver is connected to the output of another electronic driver or to the output of a microcontroller, and
   the single output of each electronic driver is connected to the single connection input of another electronic driver or to the output of a microcontroller; and wherein:
   each said electronic driver is a part of a driver chain between two controller modules.

2. The system of claim 1 wherein the plurality of controller modules, the plurality of electronic drivers, and their connections are part of a strongly connected graph.

3. The system of claim 1 wherein at least one electronic driver is connected to a microcontroller which is not part of a controller module.

4. The system of claim 1 wherein signal emitters comprise Light-Emitting Diodes (LEDs).

5. The system of claim 4 wherein the LEDs and the plurality of electronic drivers are disposed on LED strips.

6. The system of claim 5, wherein the system comprises one or more LED vertex arrangement of LED strips, said LED vertex arrangement comprising three unidirectional LED strips arranged in a triangular pattern.

7. The system of claim 1, wherein one or more controller modules comprise wired and/or wireless communication interfaces to receive or to send data.

8. The system of claim 1, wherein one or more controller modules comprise one or more sensors comprising at least one of the following: an ambient light sensor, a distance sensor, a motion sensor, a proximity sensor, an imaging sensor, a microphone, a temperature sensor, a pressure sensor, a moisture sensor, a voltage power sensor, or a combination thereof.

9. The system of claim 1, further comprising one or more power supply sources, said one or more power supply sources being adapted to distribute power to controllers modules and LED strips.

10. The system of the claim 1, wherein a controller module and/or a signal emitter and/or an electronic driver is adapted to distribute said power supply to the entire system.

11. A method comprising the step of controlling a system of interconnected signal emitters,
   the system comprising a plurality of controller modules, a controller module comprising a microcontroller having a connection input and a connection output;
   a microcontroller controlling one or more electronic drivers;
   a plurality of electronic drivers, an electronic driver controlling one or more signal emitters and comprising a connection input and a connection output;
   wherein the connection input of each electronic driver is connected to the output of another electronic driver or to the output of a microcontroller;
   wherein the single output of each electronic driver is connected to the single connection input of another electronic driver or to the output of a microcontroller; and
   wherein each said electronic driver is a part of a driver chain between two controller modules.

12. The method of claim 11, further comprising the step of counting the controller modules and/or electronic drivers and/or microcontrollers.

13. The method of claim 11, further comprising the step of detecting addition, removal, and/or failure of one or more controller modules.

14. The method of claim 11, further comprising the step of communicating a reset signal across the system.

15. A computer program comprising non-transitory instructions for carrying out the steps of the method according to claim 11 when said computer program is executed on a suitable computer device.

* * * * *